Dec. 21, 1943.                M. L. TAYLOR ET AL                2,337,426
                SYSTEM OF INFLATION AND APPARATUS FOR OPERATING THE SAME
                        Filed Jan. 19, 1940            2 Sheets-Sheet 1
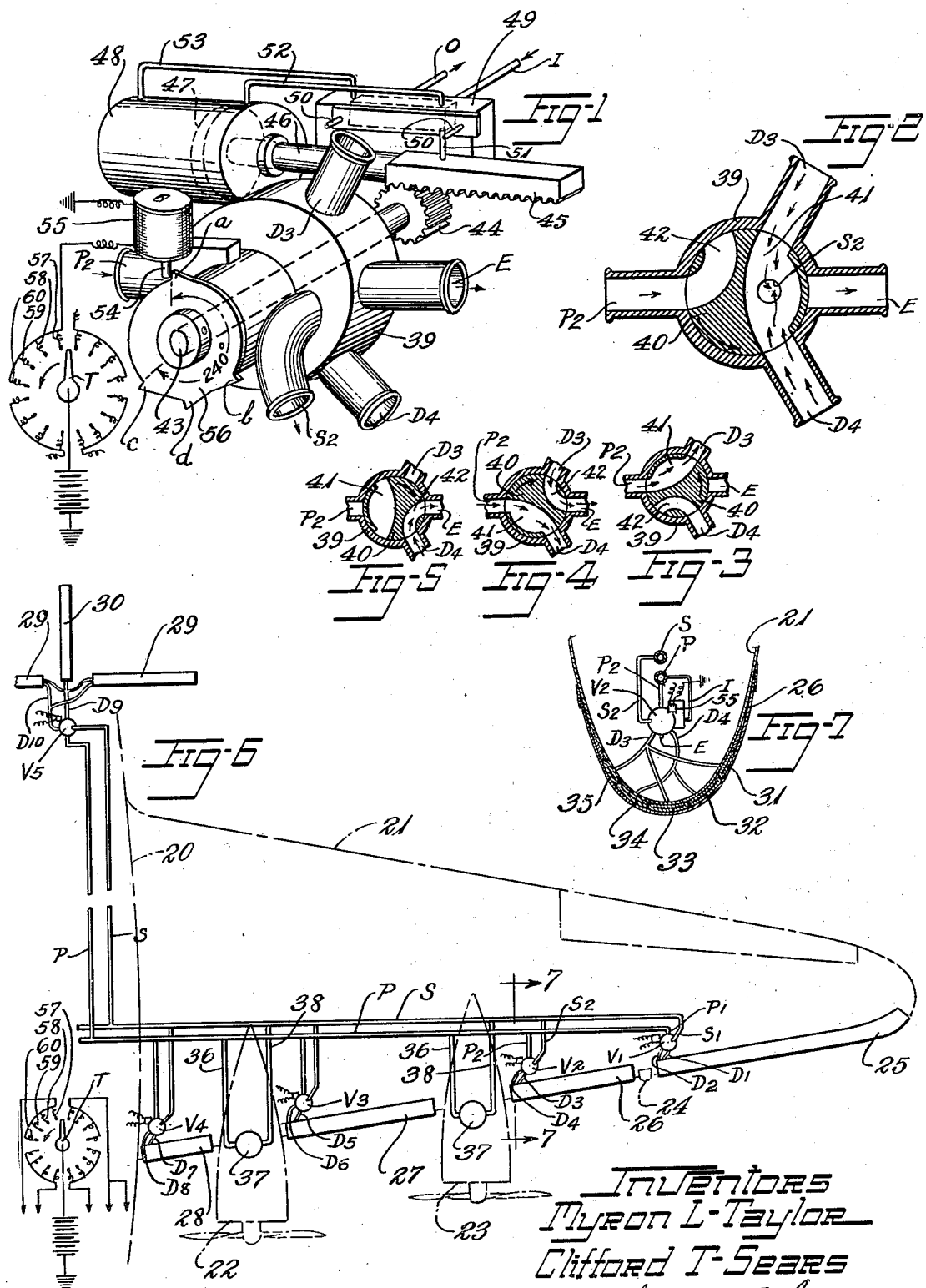
Inventors
Myron L. Taylor
Clifford T. Sears
By Willis F. Avery
Atty.

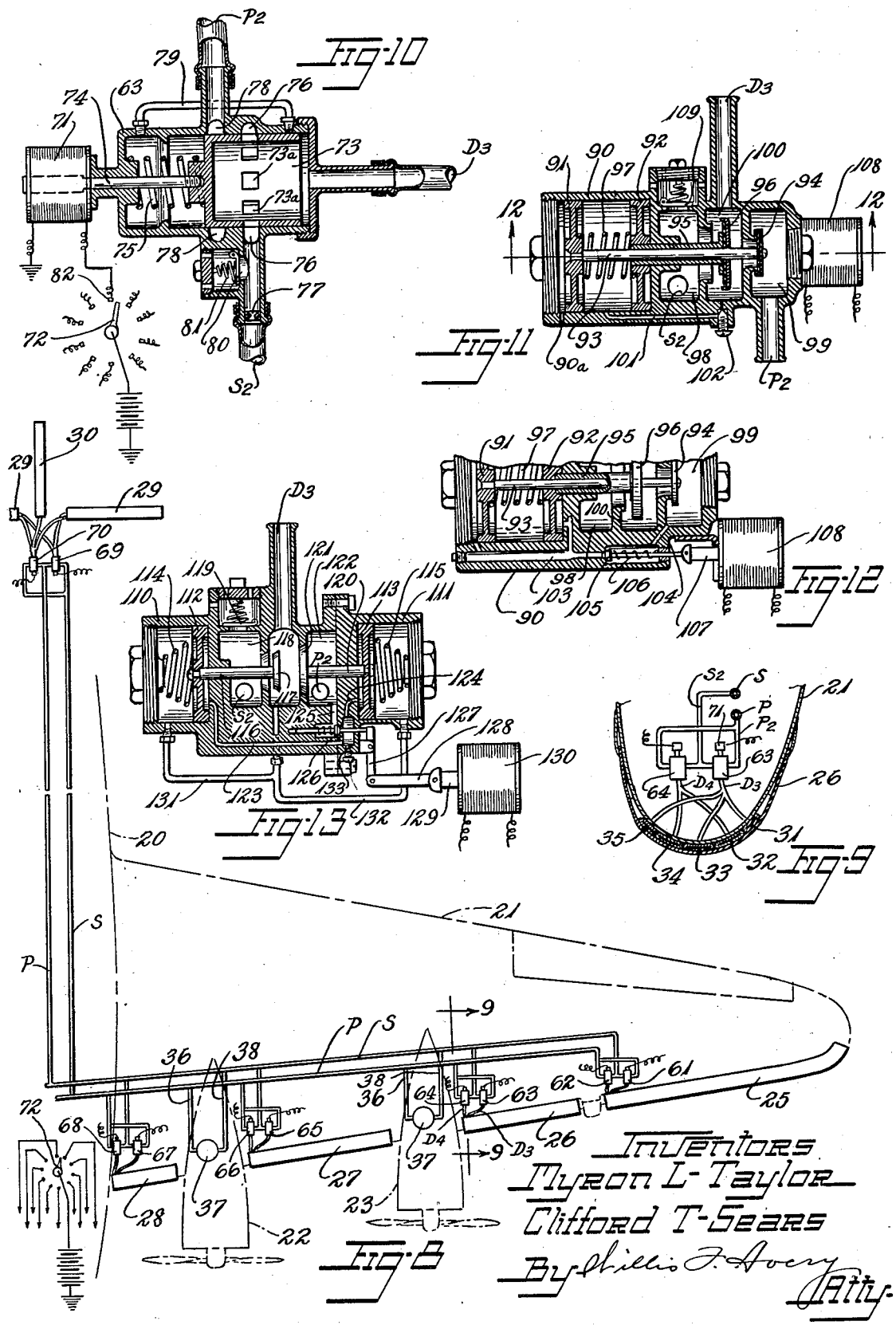

Patented Dec. 21, 1943

2,337,426

UNITED STATES PATENT OFFICE 2,337,426

SYSTEM OF INFLATION AND APPARATUS FOR OPERATING THE SAME

Myron L. Taylor, Hudson, and Clifford T. Sears, Akron, Ohio, assignors to The B. F. Goodrich Company, New York, N. Y., a corporation of New York Application January 19, 1940, Serial No. 314,620

11 Claims. (Cl. 244—134)

This invention relates to a system of inflation units such as are useful on wings, airfoils and other surfaces of aircraft for preventing the accumulation of ice by intermittent inflation of the units.

It has been proposed heretofore to provide a plurality of inflatable units extending along the leading edges of each wing of the aircraft and to inflate and deflate such units in alternation, corresponding units at opposite sides of the craft being operated preferably together for balanced operation. However, the control of such units for their several operations in alternation and in cycles has been effected heretofore by a single distributor mechanism for the whole system. This has required extensive piping from the single distributor mechanism to the several units, which extensive piping has had the disadvantage of adding considerable weight to the aircraft and occupying precious space, as well as increasing the complexity of mechanism.

The chief objects of this invention are to simplify the piping and mechanism and to this end to provide distributor means suitable for location at each inflatable unit so that a common supply line for the units can be utilized. A considerable reduction in the amount of piping is thus made possible and each distributor may be of relatively small size as compared with the single distributor heretofore proposed for all the units.

A further object of the invention is to provide distributor mechanism operated by the pressure of the inflation medium to the end that the power mechanism may be further simplified.

These and further objects will be apparent from the following description, reference being had to the accompanying drawings in which:

Fig. 1 is a perspective view of a distributor mechanism constructed according to and embodying the invention, electrical connections being indicated diagrammatically.

Fig. 2 is a vertical section of the distributor taken at the distributor valve.

Figs. 3, 4 and 5 are views like Fig. 2 on a reduced scale, parts being, however, broken away, showing the valve in each of its several successive operating positions.

Fig. 6 is a diagrammatic plan view of one side of an airplane showing a system of inflatable units connected for operating in accordance with the invention, the outline of the airplane wing with motor nacelles and part of the fuselage being shown in broken lines.

Fig. 7 is a section of the airplane wing taken along the line 7—7 of Fig. 6.

Fig. 8 is a view like Fig. 6 but showing modified distributing mechanism and timing system.

Fig. 9 is a section taken along the line 9—9 of Fig. 8.

Fig. 10 is a horizontal section, with parts broken away, of the embodiment of distributor mechanism of Fig. 8.

Fig. 11 is a horizontal section of further modified distributor mechanism suitable for use in the system of Fig. 8.

Fig. 12 is a fragmentary vertical section of the distributor mechanism of Fig. 11, taken along the line 12—12 of Fig. 11.

Fig. 13 is a horizontal section of still further modified distributor mechanism suitable for use in the system of Fig. 8.

With reference first to the embodiment of Figs. 1 to 7, the invention is illustrated as applied to an airplane having a fuselage 20 and a port wing 21, the latter carrying an inboard motor nacelle 22, an outboard motor nacelle 23 and a landing light 24. An inflatable member extending from the wing tip to the landing light 24 is indicated at 25. Between the landing light and the outboard motor nacelle 23 is mounted an inflatable member 26. Between the two motor nacelles 23 and 22 is mounted an inflatable member 27. An inboard member 28 is mounted between the inboard nacelle and the fuselage. These members and their arrangement may be duplicated for the wing at the other side of the aircraft. Inflatable members 29, 29 are mounted upon the horizontal stabilizers of the tail group and an inflatable member 30 is mounted upon the vertical stabilizer.

Each inflatable member comprises one or more inflatable tubes, depending upon the thickness of the wing or other airfoil section at the location of the member. For example, the member 26 shown in cross section in Fig. 7 comprises five inflatable tubes 31, 32, 33, 34 and 35 mounted within an elastic outer cover of the member. The tubes of each member are inflated preferably by groups of the tubes in alternation. Tubes 31, 33 and 35 may be operated as a group and the tubes 32 and 34 may be operated as a group, each group of tubes being regarded as an inflatable unit.

For supplying air under pressure to all the units a pressure supply line P is provided, this line having connections 36, 36 with the pressure side of pumps 37, 37 which may be located in the motor nacelles to be driven by the main motors of the aircraft. For removing air from the inflatable units a suction line S extending to all the units is connected at 38, 38 to the suction side of the pumps 37, 37.

At each of the four inflatable members of each wing and at the tail group is provided a distributor, these being indicated at V—1 to V—5, for controlling the cyclic inflations and deflations of the inflatable units.

As the distributors may be of identical construction only one need be described, for example that of V—2 of Figs. 6 and 7. With reference especially to Figs. 1 to 5 the distributor comprises a casing 39, housing and valve rotor 40. The casing has ports leading to connections D—3 and D—4 for the two inflatable units of the members 26, a port for a pressure inlet connection P—2 connected to the pressure line P, and a port for connection S—2 to the suction line S, and a port for exhaust connection E to atmosphere. The ports for connections D—3 and D—4 are 120° apart, the port for exhaust connection E is 60° from each of the first two ports and the port for the pressure connection P—2 is diametrically opposite the port for exhaust connection E. The rotor is apertured to provide a through passage 41 opening at positions 120° apart and shown in connection with the suction ports in the position of Fig. 2, and a second passage 42 having openings 60° apart in the relationship shown in Figs. 2 to 5.

The rotor 40, mounted upon a shaft 43, is oscillated through 240° by means of a pinion 44 operated by a rack 45 mounted upon a rod 46 of a piston 47 in an operating cylinder 48. The piston 47 is double acting, being reversed at each end of its travel by a reversing gear 49 which in turn is operated by limit pins 50, 50 engaged by a pin 51 upon the rack 45. The reversing gear may be of any suitable construction, known per se. The piston 47 is operated by air under pressure from the pressure line P connected by a branch pipe I (Fig. 7) through the reversing gear 49 to both ends of the cylinder 48 by means of pipe connections 52, 53. An exhaust connection O, open to the atmosphere permits venting of the air from the front side of the piston upon its movement in each direction.

When the main pumps 37 are in operation the mechanism hereinbefore described tends to oscillate the rotor 40 back and forth continuously. The rotor, however, is restrained in such movement by the plunger 54 of a solenoid 55 engageable with stops or detents a, b, c, and d extending radially outward from a disc 56 secured to the shaft 43 of the valve rotor 40.

Operation of the solenoid 55 is controlled by an electric timer T which may be centrally located in the aircraft and is connected electrically with the solenoids of all the distributors. As will be seen from the wiring diagram at the left of Figs. 1 and 6, the taps of the timer are divided, in the form shown, into four groups, each having four taps having a common connection to the solenoid of a distributor. The distributor V—5 of the tail group may be operated with the distributor V—4 of the inboard inflatable member 28, so that the timed cycle of the system is in four divisions. Upon contact of the timer arm with a tap, the plunger of the connected solenoid is withdrawn momentarily and the rotor is permitted to rotate for a part revolution under the power of the rack and pinion drive until the plunger engages the next projection of the disc 56 in its path. Four releases and engagements of the plunger 54 with the stops a, b, c and d constitute an operating cycle for two inflatable units.

With the parts in the position of Figs. 1 and 2 the inflatable units are in a deflated condition and suction is being applied to both units through their connections D—3 and D—4 with the suction connection S—2. The piston 47 is about to start a movement to the left in Fig. 1, but this movement is restrained by engagement of the solenoid plunger 54 with the detent a. Assuming now that the timer arm is rotated in the counter clockwise direction, as the timer arm makes momentary contact with the first tap 57, the circuit is complete through the solenoid 55 to raise the plunger 54 and permit the plunger to drop again when the timer arm is passed over the tap 57. In the meantime, however, the valve rotor 40 has been put into movement counter clockwise by movement of the piston 47 and this movement continues through 120° until stopped by engagement of detent b with the plunger. The valve rotor now occupies the position of Fig. 3 wherein connection of both inflatable units has been closed to suction and connection D—3 has been opened to the pressure connection P—2 to inflate one of the units. Upon contact of the timer arm with tap 58, the solenoid is again energized to raise the plunger, permitting the rotor 40 to continue its counter clockwise rotation to the end of its 240° movement, which corresponds with movement of the piston 47 to the left-hand end of the cylinder 48. The piston 47 may start on its return movement to the right, but clock-wise rotation of the valve rotor 40 is prevented by the engaging of the plunger 54 with the detent c, holding the rotor in the position of Fig. 4. In this position the unit that has just been inflated through the connection D—3 is now open to exhaust connection E for deflation of the unit, and the unit of connection D—4 is open to the pressure connection P—2 for inflation.

Upon contact of the timer arm with tap 59 the solenoid is again energized to disengage the plunger from detent c whereupon clock-wise rotation of the valve rotor takes place until stopped by engagement of the plunger with detent d resulting in the position of the rotor shown in Fig. 5. In this position inflation pressure is cut off to both inflatable units and deflation of the second unit through its connection D—4 is permitted by exhaust through the connection E.

Upon contact of the timer arm with the fourth tap 60 of the group the plunger 54 raises from the detent d and permits clock-wise rotation of the valve rotor back to the position of Figs. 1 and 2, ready to start another cycle of operation under control of the timer. During the interval between inflation phases the valve rotor remains in the position of Fig. 2 wherein suction on both inflatable units is maintained to assure their complete deflation and prevent fluttering. In the cyclic operation of the inflatable units in alternation each unit undergoes three phases of operation, that of inflation, followed by an exhausting phase to atmosphere, and a suction phase. The bulk of the inflation air in the unit is exhausted before the suction line is connected so that there is no appreciable loss of suction, which is advantageous in case the suction pump is used also for other purposes, such, for example, as to operate instruments or other mechanisms.

Referring now to the embodiments of Figs. 8, 9 and 10, the system and its operation are the same as hereinabove described for the first embodiment except that a modified form of distributor mechanism is utilized and the timer arrangement is somewhat different. In this embodiment each inflatable unit has its individual distributor mechanism, there being two such distributor mechanisms for each inflatable member having two inflatable units instead of one as in the first embodiment. Similar parts in the two embodiments are designated by common reference designations.

In the embodiment of Figs. 8 to 10, eight distributor mechanisms 61 to 68 are provided for the eight inflatable units of each wing and the tail group has two distributor mechanisms 69 and 70.

As all the distributor mechanisms may be identical, only one, for example 63, need be described. Referring to Fig. 10, the distributor shown is operated as well as controlled by a solenoid 71 through a timer mechanism 72. The distributor 63 comprises a cylindrical casing in which is mounted a valve 73 that is reciprocated in the horizontal direction by means of a rod 74 consisting of an extension of the solenoid plunger. A compression spring 75 urges the valve 73 to the right as viewed in Fig. 10. At its right-hand end the cylinder has a connection D—3 to the inflatable unit. At one side of the casing is a port 76 communicating with the suction line S—2 through the restricted orifice 77. The port 76 may comprise a manifold passage about the casing, and in the position of the parts shown in Fig. 10 it is in communication with a circle of apertures 73a, 73a in the valve 73, so that suction is applied to the inflatable unit. At a position to the left of manifold port 76 is a second manifold port 78 having a connection P—2 to the pressure line. A by-pass line 79 permits venting of air from one side of the piston valve to the other when it is moved.

For the purpose of permitting a large bulk of the air from the inflatable unit to exhaust to atmosphere rather than into the suction line after an inflation of the unit, the exhaust port 76 is in communication with a valve 80 held closed by a light pressure spring 81 in an arrangement such as to permit air under sufficient pressure from the inflatable unit to vent to atmosphere through this valve. After this valve has been closed residual air in the unit is withdrawn through the suction line S—2, the restricted orifice 77 permitting a slow withdrawal of the air and permitting the exhausting of a large part of the air under pressure through valve 80.

Assuming now that the timer 72 has been put into operation, there being preferably a tapped connection to each solenoid in turn, when the timer arm makes momentary contact in passing over tap 82 the solenoid 71 is energized and piston valve 73 is drawn to the left closing the inflatable unit to suction and opening it to the pressure line P—2. As the contact is only momentary, the solenoid is quickly de-energized whereupon the spring 75 tends to urge the valve back to the position shown. In this movement the piston is resisted by air under pressure in front of it and its return movement is permitted only by a slow flow of air through the by-pass 79 and opens the exhaust unit in connection with the exhaust valve 80 and the suction line S—2 as hereinbefore described.

Each inflatable unit has its own distributor and the solenoid of each distributor is connected electrically with its own tap on the timer, there being ten such taps in the form shown for the eight distributors of each wing and two for the tail group.

The distributor of Figs. 11 and 12 performs the same functions as the distributor of Fig. 10 and may be used in lieu thereof, but its construction and operation are somewhat different. A cylinder 90 has opposed relatively movable pistons 91, 92. The piston 91 has its rod 93 connected to a valve 94 and piston 92 has a sleeve rod 95 secured to a valve 96. A spring 97 normally urges the two pistons apart to the positions shown. There are three chambers at the right-hand end of cylinder 90, a suction chamber 98 having a connection to a suction line S—2, a pressure chamber 99 opening to pressure line connection P—2, and an intermediate chamber 100 opening to the connection D—3 to the inflatable unit. Valve 94 of one piston controls communication of the intermediate chamber 100 with the pressure chamber 99, and valve 96 controls communication of the intermediate chamber with the suction chamber 98. A passage 101 in the cylinder casing puts the space between the pistons 91 and 92 into communication with the intermediate chamber 100 and the flow in this passage is controlled by an adjustable needle valve 102. Air pressure may be introduced at the end faces of the two pistons through a passage 103 communicating with pressure chamber 99 through a passage 104 and flow through passage 103 is controlled by a valve 105 urged to closed position by a light compression spring 106. The valve 105 may be operated by movement of a plunger 107 of a solenoid 108 which may be connected to a timer like that of Fig. 10.

The suction chamber 98 has a spring-pressed exhaust valve 109 which may have the construction and operation of the valve 80 of Fig. 10.

Assuming the parts to be in the position shown in Figs. 11 and 12, the inflatable unit is now in communication with the suction line. Upon a momentary energizing of the solenoid 108 by the timing mechanism, valve 105 is opened momentarily permitting a flow of air under pressure from the pressure chamber 99 to the spaces behind the two pistons 91 and 92 causing them to be moved together toward the center of the chamber, while the air between them vents through passage 101. This movement opens valve 94 and closes valve 96, thus closing the unit to suction and opening it to pressure for inflation. The air under pressure also flows slowly through passage 101 until the pressure between the pistons is sufficient to augment the action of the spring 97 to urge the pistons apart again, excess pressure at the ends of the pistons being permitted to leak to atmosphere through an opening 90a in common with both outer ends of the pistons through the common passage 103. Upon return of the parts to the position shown the inflatable unit is again closed to pressure and opened to suction. The first rush of air upon deflation opens exhaust valve 109 to vent this air overboard and the remaining air is withdrawn through the suction line S—2.

With reference now to the embodiment of Fig. 13, two opposed piston chambers 110 and 111 have respective pistons 112, 113, which are urged toward each other by springs 114 and 115. Piston 112 has its rod 116 secured to a valve 117 controlling communication of an intermediate chamber 118 leading to a unit connection D—3 with a suction chamber 119 having a suction connection S—2 and an exhaust valve 119 like that of Figs. 10 and 11. Piston 113 has its rod 120 secured to a valve 121 controlling communication of chamber 118 with a pressure chamber 122 in communication with pressure connection P—2. Passage 123 and 124 are adapted to introduce air under pressure from pressure chamber 122 through passage 125 to the spaces behind pistons 112 and 113 to urge them apart, this action being controlled by a valve 126 which is spring pressed to closed position and is operated through levers 127, 128 by a plunger 129 of a solenoid 130. By-pass connections 131 and 132 permit flow of air between the spaces at the ends of pistons 112 and 113 and the intermediate chamber 118.

In the position of the parts shown the unit is in connection with suction. Upon the momentary energizing of the solenoid 130 by the timer both pistons are moved apart by air pressure through valve 126 to close suction valve 117 and open pressure valve 121 for inflation of the unit. Such air pressure through intermediate chamber 118 also flows through connections 131 and 132 to the spaces at the ends of the pistons until the pressure there is sufficient to augment the action of the springs 114 and 115 to return the pistons to the positions shown, the excess pressure at the other sides of the pistons being permitted to vent through a bleeder 133 to permit this action. Upon return to the position shown the unit is closed to pressure and is again open to suction, exhaust valve 119 functioning in the manner hereinbefore described to vent the bulk of the air from the unit during deflation.

Variations may be made without departing from the scope of the invention as it is defined in the following claims:

We claim:

1. A system of inflation units comprising a plurality of inflatable units, a pressure supply line for said units, outlet means therefor, a plurality of distributor mechanisms for the units to connect said supply line and said outlet means in alternation with the units, there being a distributor mechanism individual to each unit, and timing means common to said distributor mechanisms for controlling the operation of the distributor mechanisms of the units in alternation.

2. A system of inflation units comprising a plurality of inflatable units, a pressure supply line and a suction line therefor, distributor mechanisms for the units to connect said supply line and said suction line in alternation with the units, a distributor mechanism being located at each unit, and timing means common to the distributor mechanisms for controlling the operation of the distributor mechanisms in alternation.

3. A system of inflation units comprising a plurality of inflatable units, and means for inflating said units in alternation, said means comprising a plurality of distributor mechanisms for the units and connected thereto, there being a distributor mechanism individual to each unit, means for supplying an inflation medium to said mechanisms, and timing means common to said distributor mechanisms.

4. A system of inflation units comprising a plurality of inflatable units, means for inflating said units in alternation, said means comprising a plurality of distributor mechanisms for the units and connected thereto, there being a distributor mechanism individual to each unit, means for supplying an inflation medium to said mechanisms, and timing means common to said distributor mechanisms.

5. A system of inflation units for aircraft comprising inflatable units arranged on port and starboard airfoils of the aircraft with a plurality of said units on each of said airfoils, means for inflating units on one of said airfoils in alternation one with another and together with corresponding units on the other of said airfoils, said means comprising a plurality of distributor mechanisms for the units, a distributor mechanism being located at each unit, means for conducting said inflation medium to said mechanisms, and timing means common to said distributor mechanisms.

6. Apparatus as defined in claim 1 in which each distributor mechanism comprises valve means movable in oscillations to positions for opening the connections to the unit in cyclic operation, and means for imparting such oscillatory movement to the valve means.

7. Apparatus as defined in claim 1 in which each distributor mechanism comprises a valve member, means for moving the valve member to pass air from the pressure connection into the unit to start an inflation, and means for utilizing air under pressure for returning the valve member automatically to a position connecting the element with the outlet connection.

8. A system of aircraft ice-removing inflation units comprising a plurality of inflatable units, means for inflating the units in alternation comprising a plurality of valves each individual to and having a connection with an inflatable unit and each having inlet and exhaust connections for flow of inflation medium into the unit and exhaust therefrom, means at each of said valves for operating the same to connect the inflatable unit with said inlet and exhaust connections in rapid alternation, an inflation supply line to the inlet connections of said valves, and timing means common to the operating means of said valves.

9. A system of aircraft ice-removing inflation units comprising a plurality of inflatable units, means for inflating the units in alternation comprising a plurality of valves each individual to and having a connection with an inflatable unit and each having inlet, exhaust and suction connections for flow of inflation medium into the unit and exhaust and suction therefrom, means at each of said valves for operating the same to connect the inflatable unit with said inlet connection in rapid alternation with said exhaust and suction connections, an inflation supply line to the inlet connections of said valves, a suction line to the suction connections of said valves, and timing means common to the operating means of said valves.

10. A system of aircraft ice-removing inflation units comprising a plurality of inflation units, valve mechanisms individual to the respective inflatable units, and timing mechanism controlling operation of said valves, each said valve mechanism comprising a body having a transferring connection for an inflatable unit and inlet and exhaust connections, poppet valves between said transferring connection and said inlet and exhaust connections, and means for moving said poppet valves to place said transferring connection alternately in communication with said inlet and exhaust connections, said means including a solenoid and electrical connections for connecting the same with said timing mechanism.

11. A system of aircraft ice-removing inflation units comprising a plurality of inflation units, valve mechanisms individual to the respective inflatable units, and timing mechanism for controlling operation of said valves, each said valve mechanism comprising a body having a transferring connection for an inflatable unit and inlet, exhaust and suction connections, poppet valves between said transferring connection and, respectively, said inlet connection and said exhaust and suction connections, and means for moving said poppet valves to place said transferring connection alternately in communication with said inlet connection and with said exhaust and suction connections, said means including a solenoid and electrical connections for connecting the same with said timing mechanism.

MYRON L. TAYLOR.
CLIFFORD T. SEARS.